June 7, 1938.  C. B. MATHEWS ET AL  2,120,138
METHOD FOR PRODUCING FOOD PRODUCTS
Filed Dec. 6, 1933
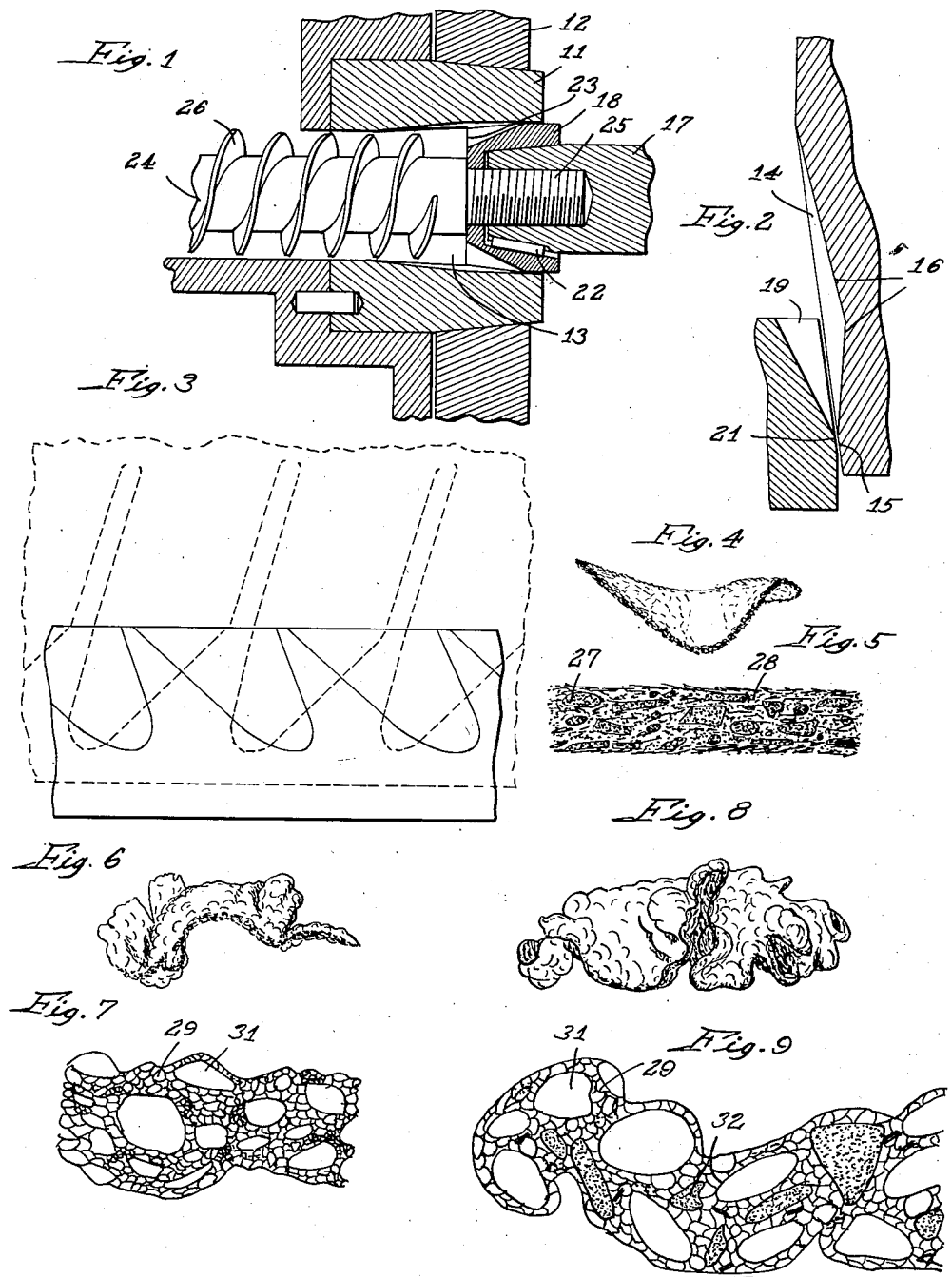
Inventors:
Clair B. Mathews,
Harry W. Adams,
Earl E. Berry
By Wilson, Dawell, McCanna & Wintercorn
Attys.

Patented June 7, 1938

2,120,138

UNITED STATES PATENT OFFICE 2,120,138

METHOD FOR PRODUCING FOOD PRODUCTS

Clair B. Mathews, Harry W. Adams, and Earl E. Berry, Beloit, Wis., assignors to Flakall Corporation, Beloit, Wis., a corporation of Delaware Application December 6, 1933, Serial No. 701,120

4 Claims. (Cl. 99—81)

This invention relates to food products and to methods for producing the same.

The invention contemplates new food products for humans and for animals, and also new methods for manufacturing such products. According to our invention, a wide variety of products of flake-like structure may be produced from grains, raw materials, waste materials, or mixtures thereof, having new and beneficial properties, whereby such grains and materials have greater utility and value. These products for human consumption are in the nature of cereal or breakfast foods or are used in the making of beverages or other food products; and for animal consumption they are in the nature of stock and poultry feeds.

Considering the invention as it applies to grain feed products, it is noted that kernels of grain in their natural state have a surface skin or envelope on the outer surface of the kernel. Within the envelope the kernel is fabricated of a network of cell walls forming cells which contain a large portion of the nutritive value of the grain. Much of the nutritive portion of the grain also exists in the form of granules within the cells. For this reason, when the whole grain is utilized as a food in its natural state it is necessary for the digestive agents of the animal to first penetrate through and break down the envelope and also to disrupt the cells and granules before actual digestion may begin, that is, the process of converting the food constituents such as starch, etc., into such form that they may be absorbed through the intestinal walls. With many types of grain the envelope is quite highly impervious and the penetration of the digestive juices into the kernel is comparatively slow so that frequently the grain passes completely through and out of the digestive system without completing digestion, in some cases before digestion is substantially started. In this way, much of the food value of the grain is lost to the animals. In order to facilitate the digestive processes the envelope of the kernel is frequently broken up by grinding, that is, the animal is fed ground grain rather than the whole grain. While this operation breaks up the envelope surrounding the kernel, it does not disrupt the cellular structure of the grain and consequently each particle still retains substantially its former cell structure. Thus, while the grinding facilitates the digestive processes to a certain extent, they may be aided still further by disrupting the cell walls and granules.

A decided objection to ground grain for many purposes lies in the fact that it is impossible to accomplish the grinding operation without producing a large quantity of so-called fines or dust, which consists of very fine particles of grain. These fine particles in some instances are detrimental to the animals because of the fact that while they are eating the grain, they breathe a considerable quantity of the dust into their lungs, which causes various types of respirational disturbances and inflammations, such as sniffles in rabbits and heaves in horses. Furthermore, considerable quantities of the grain are lost through the fine particles being blown away during the grinding, the transportation, and the feeding thereof. Sometimes it is desirable to feed the ground grain in the open, in which case the wind blows a considerable amount of it away. In other cases, it is desirable to feed the grain by spreading it upon the ground, in which case the ground grain becomes lost through being mixed with the soil.

A primary object of the invention is, therefore, to provide a novel food product in an improved flake-like form substantially free from fine particles yet possessing substantially all of the advantages of a ground product, and having properties superior to a ground product.

Another object is to provide certain novel flake-like products processed from grain or granular material wherein the cell structure has been broken down and exploded giving a porous, puffed structure having certain properties particularly desirable for food products as well as for use in the processing or manufacture of other food products and beverages.

Another object of the invention is the provision of a rough feed in an improved physical form.

A still further object of the invention is the provision of an improved food product wherein ground particles are cemented together in sheet or flake form.

We have also aimed to provide a food product wherein ground particles are cemented together in sheet form by the naturally occurring agencies of the material and wherein the product has a multitude of voids producing a porous structure.

Another object of the invention is the provision of new and improved processes for manufacturing the flake-like products above referred to.

Another aim of the invention is to provide food products having superior properties for feeding purposes, of enhanced palatability, portability, storageability, digestibility, and nutritive value.

Other objects will become apparent from the following description and the accompanying drawing, in which—

Figure 1 is a fragmentary section through a machine suitable for carrying out the method in a single operation;

Fig. 2 is an enlarged fragmentary section through the rotor and stator of the machine shown in Figure 1;

Fig. 3 is a fragmentary development of the surfaces of the rotor and stator showing the relationship between these parts;

Fig. 4 is a perspective view of one form of the product;

Fig. 5 is a section through the product shown in Fig. 4;

Fig. 6 is a perspective view of the product made from rice;

Fig. 7 is a section through the product shown in Fig. 6;

Fig. 8 is a perspective view of the product made from corn, and

Fig. 9 is a section through the product shown in Fig. 8.

The present invention contemplates a product which embodies substantially all of the advantages of comminuted grain and has numerous other characteristics which render it a new and novel product. This product has not only the kernels broken up, but in addition, has the cell structure and granules substantially ruptured so as to permit almost immediate access of the digestive reagents to the nutritive part of the feed. In addition, naturally occurring constituents of the grain, liberated by the disruption of the cellular structure, are employed for cementing the particles together to produce an improved physical form wherein the particles are held in sheet or flake form, the sheets or flakes being of greater or lesser size depending upon the details of their manufacture.

The invention also contemplates products having new properties and characteristics making them adapted for new uses and purposes, including human cereal foods. Such products may embody a variety of ingredients which are so intermixed and blended by the processing as to substantially lose their identity and become a substantially uniform flaked product of novel and unusual characteristics in taste and appearance. One such product is a flaked corn and raisin food, the raisin being uniformly distributed through the mass, losing its identity in the mass and imparting a novel flavor and texture to the flake. Some of these products are in the nature of puffed or popped products in which the material is greatly expanded and possesses exceptional lightness and crispness because of such expanded flake-like structure. Such products constitute admirable breakfast cereals of corn, wheat, rice, and the like.

The same type of product may be advantageously used in animal feeding. For example, in the manufacture of a rabbit feed we may take all of the ingredients entering into a well balanced ration, such as alfalfa hay, cereals, salt, etc., and convert the ration into a new form in which substantially all of the dust is eliminated and the physical form of the product is such that the ingredients cannot separate out or become segregated, as is common in the shipment or storage of heterogeneous materials.

The invention also contemplates a method for the production of a food product which includes the steps of grinding the grain or other raw material, where necessary, and then extruding the ground mass under pressure between closely spaced surfaces to convert it into sheet or flake form, which steps may advantageously be carried out in a single operation where the raw material or materials are such that both steps are necessary.

The method contemplates first grinding the grain when necessary so as to break up the kernel and to a certain extent disrupt the cellular structure thereof and then extruding the ground mass between closely spaced heater surfaces in order to further disrupt the cellular structure and the granules, and to simultaneously impart flake form to the mass. Advantageously the heat may be supplied through the frictional resistance afforded during the grinding and extruding operations, and in some instances this heat will be sufficient. In most instances the heat used should be sufficient to vaporize a portion of the moisture in the grain, the elevated temperature and the pressure causing a partial cooking of the material. It has been found that in such cases the method results in the conversion of a part of the insoluble starch of the grain to soluble starch and it is very possible this soluble starch which, under the action of the heated surfaces, cements the particles together so that the particles in the resultant product adhere to form a sheet or a plurality of sheets of relatively small size, the sheets usually breaking up after extrusion. In some instances it is advisable that the extrusion surfaces have a relative movement which apparently tends to facilitate the extrusion of the material therebetween.

In Figs. 1–3, inclusive, there is shown a device arranged to accomplish the various steps of the method in a single operation, though it should be understood that the method is by no means limited to this machine nor to a machine wherein all of the steps of the method are carried out in a single operation. In this machine a stator 11 is supported in a suitable frame structure 12 and is provided with an axial opening 13. Spaced helical teeth 14 are positioned on the inner face of the stator and terminate at a smooth marginal surface 15 near or at one end of the opening 13. The bottom of the grooves between the teeth 14 slope, as indicated at 16, the grooves being of greater depth intermediate their ends. A driven shaft 17 is positioned with one end within the axial opening 13 and supports a rotor 18 on its end and within one end of the axial opening 13. The periphery of the rotor 18 is provided with helically directed spaced teeth 19 terminating in a smooth peripheral portion 21 opposite the marginal surface 15 of the stator. The rotor is secured to the shaft 17 by means of a conventional key 22 and by the shoulder 23 of a screw conveyor shaft 24 which bears against the end of the rotor when the threaded end 25 of the screw conveyor shaft 24 is threaded into the driven shaft 17. Conveyor threads 26 are positioned on the shaft 24 and serve to convey material into the axial opening 13 of the stator.

It will be seen that when the grain or other raw material is fed into the screw conveyor and the driven shaft 17 is rotated in one direction, the grain will be conveyed into the axial opening 13. As rotation continues, pressure will be applied to the grain at the inner end of the screw. This forces the grain into the grooves between the teeth 19 on the rotor and between the teeth 14 on the stator. As the screw continues to advance the grain into the stator, it is forced along the converging bottoms of the grooves in the rotor and stator and cut between the opposed teeth on these two elements. As it is pressed along in these grooves the pressure on the grain, and incidentally the temperature, is continuously increased until it reaches the opposed plain surfaces 15 and 21. At this point the teeth terminate and the mass of ground material is forced or extruded out between these closely spaced surfaces, emerging at the rear end of the stator in the form of sheets. Because of the cylindrical shape of the stator and rotor, these sheets are curved and almost immediately break up into flake-like pieces. Sometimes, depending upon the material and the conditions of operation, the material will break up in the form of ribbons. As the material passes between the surfaces it is subjected to high pressure, which, together with the heat generated by the pressure and the friction offered by the material to the rotation of the rotor, in many instances vaporizes a part of the moisture in the grain. This moisture, aided by the pressure, is believed to be effective to convert a part of the starch to soluble form, which we believe is one way in which binding material is formed. A further effect of this action is that the rapid vaporization of the naturally occurring moisture of the grains disrupts the starch granules and the cells of the grain particles. This enhances the digestibility of the material by exposing the nutritive portion of the grain to the action of the digestive agents of the stomach and intestines, thereby rendering the product more easily and rapidly digestible.

The precise shape and size of the rotor and stator, the teeth on these elements, and the conveyor will depend largely upon the type of material being passed through the machine, and the product desired. Thus, when corn, for example, is ground, it is necessary that the conveyor be of such size as to properly receive the kernels of corn and convey them into proper position between the rotor and stator and also that the spacing of the teeth in the latter elements be such as to properly receive the kernel of corn. On the other hand, where smaller grain, such as wheat or oats, are to be treated, the size and shape of the conveyor and the teeth may be altered to accommodate for the difference in the character of the grain. In each of these cases, however, the machine must function to first grind the grain as between the teeth 14 and 19, and then extrude the ground mass between closely spaced surfaces. When fine materials such as starch or meals are treated, the teeth probably serve more in a feeding function to induce the material between the spaced surfaces. The present machine possesses the advantage that the grain is initially pressed into the spaces between the teeth, and the pressure on the grain is progressively increased until it reaches the spaced plain surfaces through which it is extruded. In this way the frictional heat of the grinding operation and the pressure developed in the grinding operation is utilized to bring about the extrusion of the mass, and to heat the mass and the surfaces between which it is extruded.

The invention contemplates a wide variety of products depending upon the raw materials used, all, however, having the common properties of being composed of ground particles cemented together in sheet form by the naturally occurring constituents of the raw materials. The individual particles may and can be made so small that the product to all intents and purposes is of uniform composition. The products may vary considerably in their different characteristics, some of which form the subject matter of separate invention and are being separately described and claimed. Figs. 4 and 5 show in more or less diagrammatic manner a product designed as a feed for rabbits and consisting largely of alfalfa, wheat, corn, oats and barley. In this instance, the binding material is very probably obtained from the grains and is sufficient to bind the whole mass together to produce the sheet form illustrated. The body of the product consists of particles 27 of the various ingredients embedded or held in what might be called a continuous phase 28 of binding material. The sheet is comparatively hard and firm, and while it may be broken into smaller pieces without difficulty, this breaking is not accompanied by the production of fine particles or dust. In other words, the material breaks with a comparatively clean fracture. This material is illustrative of one class of products obtained by the present method. Most all of the so-called small grains may be produced in substantially the same form, that is, such grains as wheat, oats, barley, rye, soy beans, and the like. When the extruding faces are very closely spaced, a different type of product may be obtained with certain kinds of grain such as corn, wheat, and rice. Under these circumstances there is produced what might be called a puffing or popping effect.

In Figs. 6–9, inclusive, there is shown the second type of product which is substantially the same as the product just discussed with the exception that the material is puffed out or filled with a multitude of relatively small voids. This type of product may be made from a certain class of grains of which corn and rice are representative and is of special value in the production of cereal foods for human consumption as well as raw materials for certain process of the industries. In the manufacture of this product the sheet is caused to swell as it emerges from the extruding surfaces, due to the fact that at this point the pressure is relieved from the material permitting the steam or water to rapidly vaporize or expand which produces bubbles in the plastic mass (probably the paste-like soluble starch), thus producing the many voids found in the material. The water evaporates or condenses when the material is cooled by the surrounding air, thus fixing the porous structure. Likewise, this puffing or expansion of the sheet tends to badly distort the same to produce such shapes as shown in Figs. 6 and 8, that in Fig. 6 being rice, while that in Fig. 8 being corn. Thus, as the material emerges from the extruding surfaces, the sheet puffs up and breaks, forming leaf-like pieces. The size and shape of these pieces will vary somewhat, depending upon the space between the extruding surfaces, the amount of puffing being greater between limits as the space decreases. Each of the pieces appears to consist of body structure 29, having spaces or voids 31 distributed throughout. In some instances the structure will also contain small pieces of the raw material as shown at 32.

Some of the advantages of the product and method may be illustrated by a few examples. Cereals for human consumption made by these methods have been produced of a highly palatable nature and delicious texture and the method may be carried out at materially lower cost than that commonly used to produce cereal foods.

In the feeding of rabbits a difficult problem arises in providing the animals with a dustless feed. It appears that if the animals are subjected to any appreciable quantity of dust in their feed they soon develop respiratory disorders which affect their health and rate of growth. It is therefore essential to give them only feed which is substantially free from fine dust. By the present method a suitable feeding mixture including the roughage, such as alfalfa hay, may be produced, which is substantially free from dust and constitutes an almost ideal ration.

Another example of the utility of the product is in the feeding of western range cattle. These are many times fed directly from the ground, the grain being merely dumped on the ground to be picked up by the stock. When ground feed is employed a large amount of it is blown away by the wind and a large amount of it is mixed with the soil and is thereby lost. However, with the present product, the material is heavy enough to resist being blown about and is in sufficiently large pieces not to be lost by mixture with the soil. Furthermore, the material possesses all of the advantages of a ground feed and many more in that the envelope of the kernel has been broken up and the cellular structure of the grain has been disrupted, rendering the product more readily and easily assimilated.

While we have thus described and illustrated a specific embodiment of our invention, we are aware that numerous alterations and changes may be made therein without materially departing from the spirit of the invention or the scope of the appended claims, in which—

We claim:

1. The method of processing starchy materials to produce a puffed product which includes the step of passing uncooked comminuted material between spaced surfaces of such proximity as to generate a high pressure and temperature to vaporize the moisture and disrupt the starch granules and rapidly relieving the pressure on the material as it emerges from said surfaces to cause the same to expand to produce a dry, crisp product.

2. The method of processing starchy materials to produce a puffed product which includes the steps of grinding and extruding uncooked comminuted material under pressure between closely spaced relatively moving surfaces of such proximity as to generate a temperature greater than about 100° C. to vaporize the moisture and disrupt the starch granules, the product expanding upon reduction of the pressure at emergence from said surfaces.

3. The method of processing grains of high starch content to produce a dry puffed product which includes the steps of grinding the grain, progressively compressing the uncooked particles so that the heat of grinding and compression vaporizes the moisture of the material, then extruding the material between closely spaced relatively moving surfaces, the temperature, pressure, and moisture causing the particles to be cemented together, and suddenly relieving the pressure on the material as it is extruded to cause the material to expand, the said steps occurring progressively and merging one into the other.

4. The method of forming a food product which consists in passing uncooked comminuted material of high starch content between closely spaced surfaces under pressure and high temperature and thereafter rapidly relieving the pressure, the pressure and temperature being sufficient to vaporize at least a part of the moisture and burst the starch granules, whereby the material is caused to expand and grow in volume upon the release of pressure to produce a material of substantially uniform spongy honeycomb structure.

HARRY W. ADAMS.
CLAIR B. MATHEWS.
EARL E. BERRY.